United States Patent
Yeh

(10) Patent No.: US 8,660,119 B2
(45) Date of Patent: Feb. 25, 2014

(54) COMMUNICATION SYSTEM CAPABLE OF TRANSMITTING PACKET HAVING SUB-PACKETS

(75) Inventor: Tien-Der Yeh, Toufen Township (TW)

(73) Assignee: Mediawave Intelligent Communication Limited, Toufen Township (TW)

( * ) Notice: Subject to any disclaimer, the term of this patent is extended or adjusted under 35 U.S.C. 154(b) by 0 days.

(21) Appl. No.: 13/083,611

(22) Filed: Apr. 11, 2011

(65) Prior Publication Data

US 2012/0257619 A1   Oct. 11, 2012

(51) Int. Cl.
*H04L 12/56* (2011.01)
*H04L 12/54* (2013.01)
*H04W 28/04* (2009.01)

(52) U.S. Cl.
CPC .............. *H04L 12/56* (2013.01); *H04W 28/04* (2013.01); *H04L 12/5689* (2013.01)
USPC ........... 370/389; 370/218; 370/351; 370/400; 370/401

(58) Field of Classification Search
CPC .... H04L 12/56; H04L 1/0078; H04L 12/2055
USPC ......................... 370/389, 218, 351, 400, 401
See application file for complete search history.

(56) References Cited

U.S. PATENT DOCUMENTS

2004/0102970 A1*  5/2004  Oshikiri et al. ............... 704/233
2011/0206130 A1*  8/2011  Koto et al. ............... 375/240.21

FOREIGN PATENT DOCUMENTS

EP            1548989         *  6/2005

\* cited by examiner

*Primary Examiner* — Dang Ton
*Assistant Examiner* — Mewale Ambaye

(57) ABSTRACT

A communication system is provided. The communication system includes a first communication device having a first processing unit, and a second communication device having a second processing unit. When packetizing a packet, the first processing unit is configured to, depending on a size of information to be transmitted from the first communication device to the second communication device in the packet selectively, prepare a first sub-packet including a first sub-packet information of a first predetermined size and a first sub-packet error averting information into a first predetermined range of a first payload space of the packet, and to deliver the packet having the first sub-packet to the second processing unit.

14 Claims, 5 Drawing Sheets

COMMUNICATION SYSTEM CAPABLE OF TRANSMITTING PACKET HAVING SUB-PACKETS

BACKGROUND

Unless otherwise indicated herein, the approaches described in this section are not prior art to the claims in this application and are not admitted to be prior art by inclusion in this section.

A transmitting device and a receiving device in a conventional packet-based communication system generally communicate with each other on basis of packets. Upon receipt of a stream of information, which may include data and/or command, in terms of the packet, the receiving device would determine whether a bit error rate (BER) of the received packet satisfies a predetermined threshold, which, for example, could be 0.001. In other words, only one bit of error out of 1000 bits of the received information would be acceptable in that particular packet-based communication system. Otherwise, the receiving device may abandon the entire received packet that fails to satisfy the predetermined threshold and request for a re-delivery of the same from the transmitting device.

The transmitting device may not re-deliver the packet that fails to satisfy the predetermined threshold until after delivering another packet. The transmitting device may even have to wait until the whole stream of the information has been delivered before proceeding to re-deliver the packet that fails to satisfy the predetermined threshold. Moreover, the transmitting device is subject to time delays such as settling time between deliveries of the packets. Thus, to maintain efficiency of the packet-based communication system the occurrence of the re-delivery of the packet that fails to satisfy the predetermined threshold should be minimized.

What is needed in the art is thus a method and system that addresses at least the problems set forth above.

BRIEF DESCRIPTION OF THE DRAWINGS

So that the manner in which the above recited features of the disclosure can be understood in detail, a more particular description of the disclosure may be had by reference to embodiments, some of which are illustrated in the drawings. It is to be noted, however, that the drawings illustrate only typical embodiments and are therefore not to be considered limiting of its scope, for the disclosure may admit to other equally effective embodiments.

DETAILED DESCRIPTION

Various embodiments are described hereinafter with reference to the figures. It should be noted that the figures are not drawn to scale. It should also be noted that the figures are only intended to facilitate the description of embodiments. They are not intended as an exhaustive description of the disclosure or as a limitation on the scope of the disclosure. In addition, an aspect described in conjunction with a particular embodiment is not necessarily limited to that embodiment and can be practiced in any other embodiments.

Figure 1:
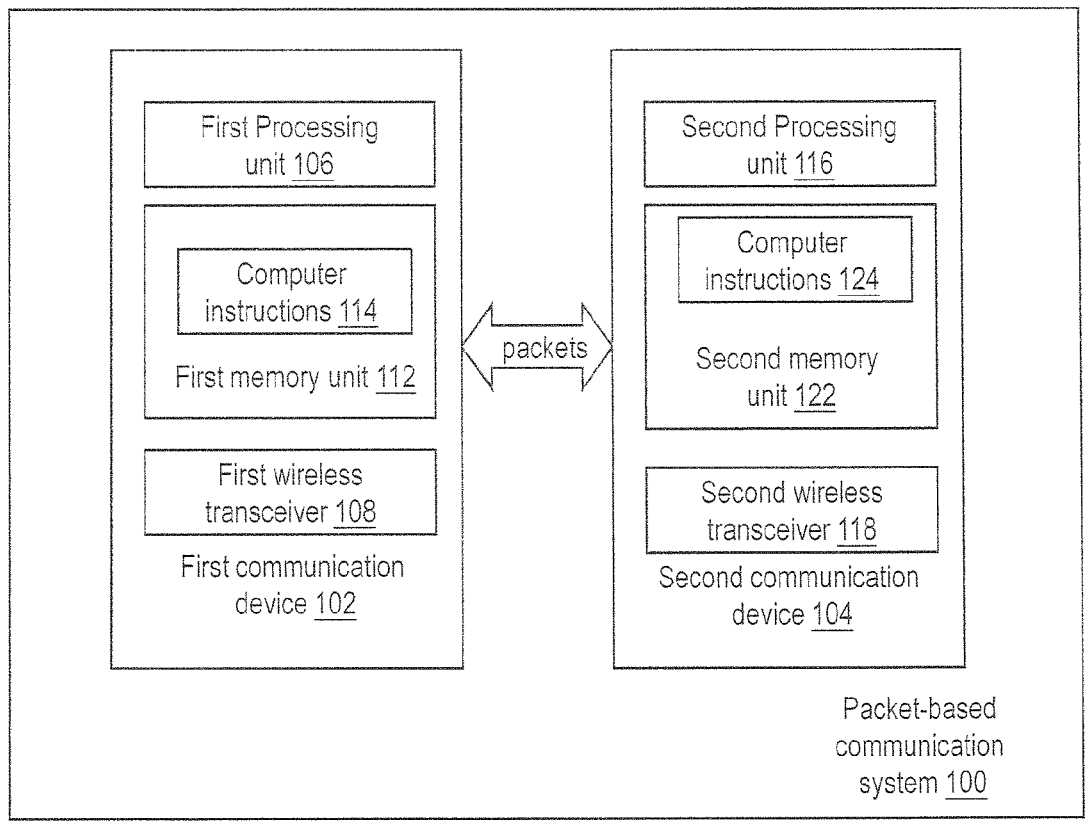
FIG. 1 is a schematic diagram illustrating a packet-based communication system, according to one embodiment of the disclosure.

FIG. 1 is a schematic diagram illustrating a packet-based communication system 100, according to one embodiment of the disclosure. The packet-based communication system 100 includes a first communication device 102 and a second wireless communication device 104. The first communication device 102 further includes a first processing unit 106 and a first wireless transceiver 108 coupled to the first processing unit 106. The first communication device 102 may also include a first memory unit 112 with computer instructions 114 stored therein. The second communication device 104 further includes a second processing unit 116 and a second wireless transceiver 118 coupled to the second processing unit 116. The second communication device 104 may further include a second memory unit 122 having computer instructions 124 stored therein. For the illustration purpose, the first communication device 102 may serve as a transmitting device when the computer instructions 114 are executed by the first processing unit 106, while the second communication device 104 may function as a receiving device when the computer instructions 124 are executed by the second processing unit 116. It is worth noting that, however, both the first communication device 102 and the second communication device 104 may be capable of functioning as the transmitting device and the receiving device when the computer instructions 114 and 124 are executed, respectively.

The first processing unit 106 is configured to prepare and packetize a packet having information contained therein before transmitting the packet to the first wireless transceiver 108. The information contained in the packet may include data, commands, or both. The packet may include several sub-packets and each sub-packet contains a portion of the data, commands, or even both of the data and commands that to be transmitted from the first communication device 102 to the second communication device 104. It is worth noting that the first processing unit 106 may deliver the packet having the sub-packets to the second processing unit 116 depending on size of the information. In one implementation, a threshold of the size of the information for the first processing unit 106 to prepare the packet having the multiple sub-packets is 32 bytes. As such, when the size of the information is larger than or equal to 32 bytes the first processing unit 106 may packetize the information in terms of the sub-packets. When the second processing unit 116 receives the packet having the sub-packets, the second processing unit 112 may piece together the data and/or commands stored in the sub-packets. On the other hand, when the size of the information is less than 32 bytes the first processing unit 106 may not packetize the information in terms of the sub-packets. Rather, that particular information may be transmitted in the packet without the sub-packets therein. Therefore, the second processing unit 116 may no longer need to piece together the data/commands in that received packet.

The first wireless transceiver 108 is configured to deliver the packet to the second wireless transceiver 118, which in turn transmits the packet to the second processing unit 116. Upon the receipt of the packet, the second processing unit 116 may further process the received packet such as de-packetizing the received packet to access the data/commands contained therein. The second processing unit 116 may also deliver an acknowledgment message to the first processing unit 106 via the second wireless transceiver 118 and the first wireless transceiver 108 so as to inform the first processing unit 106 of the receipt. When the sub-packets in the delivered packet, for some reasons, fail to satisfy the predetermined threshold for BER, the second processing unit 116 may ask for the re-delivery of the same sub-packets from the first processing unit 106.

Figure 2A:
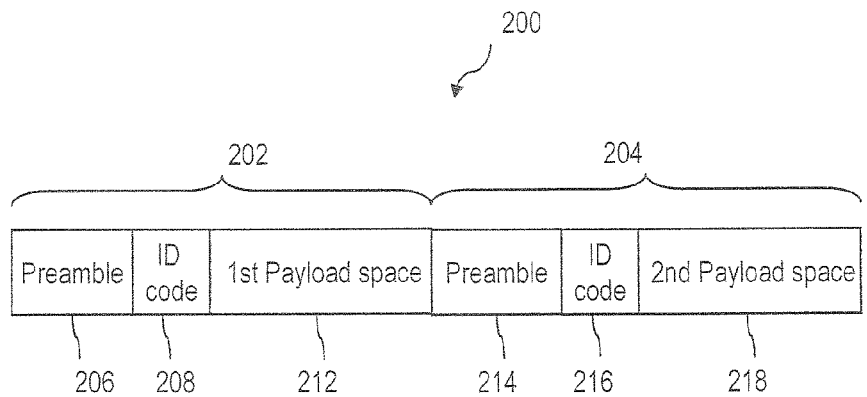
FIG. 2A is a schematic diagram illustrating a packet stream transmitted in the communication system shown in FIG. 1, according to one embodiment of the disclosure.

In conjunction with FIG. 1, FIG. 2A is a schematic diagram showing a packet stream 200 transmitted in the packet-based communication system shown in FIG. 1, according to one embodiment of the disclosure. The packet stream 200 may include a first packet 202 and a second packet 204. The first packet 202 may consist of a first preamble 206, a first identification (ID) code 208, and a first payload space 212. The second packet 204, meanwhile, may consist of a second preamble 214, a second ID code 216, and a second payload space 218. It is worth noting that the packet stream 200 may include additional packets other than the first packet 202 and the second packet 204. For the illustration purpose, only the first packet 202 and the second packet 204 are shown in the packet stream 200. It is also worth noting that the packet stream 200 may only include one packet such as the first packet 202. Both the first packet 202 and the second packet 204 may be transmitted in terms of sub-packets depending on the size of the information to be transmitted by the first packet 202 and the second packet 204.

The first preamble 206 and the second preamble 214 from the first communication device 102 may be prepared to communicate to the second communication device 104 that the information in terms of the sub-packets is to be delivered to the second communication 104.

The first ID code 208 and the second ID code 216, meanwhile, are for ensuring the information respectively stored in the first payload space 212 and the second payload space 218 to be received by intended receiving device (e.g., the second communication device 104). For example, the information stored in the first payload space 212 may be for a walkie-talkie and therefore the first ID code 208 associated with the first payload space 212 is configured to ensure that particular information would be received by the walkie-talkie rather than by devices of different types such as mobile phones. More specifically, before receiving the first packet 202 the walkie-talkie would determine whether the walkie-talkie is the intended receiving device of the first packet 202 by checking content of the first ID code 208.

The first packet 202 may include one or more sub-packets with each sub-packet having corresponding sub-packet error averting information at the first payload space 212. And the second packet 204 may include one or more sub-packets with each sub-packet having corresponding sub-packet error averting information at the second payload space 218.

Figure 2B:
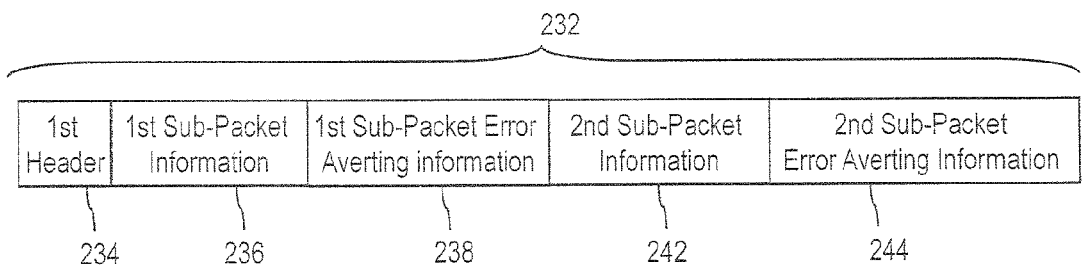
FIG. 2B is schematic diagram illustrating a payload space of the packet, according to one embodiment of the disclosure.

In conjunction with FIG. 2A, FIG. 2B is schematic diagram illustrating a payload space 232 of the packet, according to one embodiment of the disclosure. In one implementation, the payload space 232 may correspond to the first payload space 212 of the first packet 202. The payload space 232 may include a header 234, first sub-packet information 236, first sub-packet error averting information 238 corresponding to the first sub-packet information 236, second sub-packet information 242, and second sub-packet error averting information 244 corresponding to the second sub-packet information 242. In one implementation, the first sub-packet information 236 and the first sub-packet error averting information 238 collectively may be considered as one sub-packet in the first packet 202. Similarly, the second sub-packet information 242 and the second sub-packet error averting information 244 collectively may be considered as another sub-packet in the same first packet 202. The first sub-packet information 236 may be of a first predetermined size while the second sub-packet information 242 may be of a second predetermined size. In one implementation, the first predetermined size is 20 bytes in length and the second predetermined size is 32 bytes in length. And both the first sub-packet error averting information 238 and the second sub-packet error averting information 244 may be 2 bytes in length, and the first header 234 may be 12 bytes in length.

The first header 234 may begin with corresponding sync-words allowing for the receiving device to adapt to parameters over the course of the transmission of the packet such as transmission rate variation.

The first sub-packet error averting information 238 and the second sub-packet error averting information 244 may be used to detect errors associated with the first sub-packet information 236 and the second sub-packet information 244, respectively. In one implementation, the first sub-packet error averting information 238 and the second sub-packet error averting information 244 are fixed-length binary sequences such as cyclic redundancy check (CRC) codes.

It is worth noting that the first header 234 may also include sequence number information for the first sub-packet information 236. As such, when any errors associated with the first sub-packet information 236, the second sub-packet information 242, or both take place over the course of the transmission of the first sub-packet information 236 and the second sub-packet information 242 the re-delivery of the sub-packet having the sub-packet information could be readily facilitated. For example, the first sub-packet information 236 may be identified as "first" and the sequence number information ("first") associated with the first sub-packet information 236 may be stored in the first header 234. Consequently, the second sub-packet information 242 may be identified as "second" as the second sub-packet information 242. And assume the second packet 204 also includes two sub-packets, each of which includes its corresponding sub-packet information, and second sub-packet information in the second sub-packet of the second packet 204 may be recognized as "fourth" by the processing unit of the receiving device, despite no sequence number information such as "fourth" for the second sub-packet information in the second packet 204 is stored in the first header 234. Under this arrangement, when the second sub-packet information of the second sub-packet is in error the processing unit of the receiving device may ask for the re-delivery of the "fourth" sub-packet information in the packet stream such as the packet stream 200. Similarly, when the second sub-packet information 242 is in error the processing unit of the receiving device may ask for the re-delivery of the "second" sub-packet information in the packet stream 200.

The first sub-packet error averting information 238 and the second sub-packet error averting information 244 may be calculated before the transmission of the first packet 202. And upon the receipt of the first packet 202 the receiving device may decode the first sub-packet error averting information 238 and the second sub-packet error averting information 244 to determine if there is any error in the first sub-packet information 236 and the second sub-packet information 242, respectively. According to the disclosure, since the first sub-packet information 236 and the second sub-packet information 242 may be associated with the first sub-packet error averting information 238 and the second sub-packet error averting information 244, respectively, the processing unit of the transmitting device (e.g., the first processing unit 106) may be equipped with an error averting-specific hardware such as an error averting calculation unit in order to meet increasing demands in calculation of sub-packet error-averting information.

The first sub-packet error averting information 238 and the second sub-packet error averting information 246 may be used to detect or even correct the errors associated with the first sub-packet information 236 and the second sub-packet information 242, respectively, in one implementation, a conventional CRC approach is adopted to detect which sub-packet information is in error. The CRC approach may be utilized to calculate the first sub-packet error averting information 238 (e.g., the CRC code of the first sub-packet) and the second sub-packet error averting information 244 (e.g., the CRC code of the second sub-packet). And the calculated CRC codes are appended to be immediately following the first sub-packet information 236 and the second sub-packet information 242, respectively. Therefore, the payload space such as the payload space 232 shown in FIG. 2E may be prepared. And upon the receipt of the packet having the payload space 232 the CRC codes of the first sub-packet and the second sub-packet may be calculated by the receiving device to determine whether any error associated with the first sub-packet information 236 and the second sub-packet information 242 exists. In one implementation, when the calculated CRC codes are zeros the corresponding sub-packet information may be considered "correct." Otherwise, the corresponding sub-packet information may be considered "incorrect" before being abandoned.

In another implementation, both the first sub-packet error averting information 238 and the second sub-packet error averting information 244 may be copied multiple times (e.g., 3 times when FEC (forward error correction) 31 method is adopted) before the transmission of the packet having the first sub-packet. And upon the receipt of the first sub-packet the processing unit of the receiving device may compare copies of the first sub-packet error averting information 238 and the second sub-packet error averting information 244 so as to correct error exists in the first sub-packet information 236 and the second sub-packet information 242. More specifically, upon the receipt of the first sub-packet the processing unit of the receiving device may determine which copy outnumbers others before picking the first sub-packet information 236 and the second sub-packet information 244. As it is possible that two erroneous copies may be present to outnumber the correct one copy, the CRC approach may be further utilized to further determine the correctness of the first sub-packet information 236 and the second sub-packet information 242.

Figure 2C:
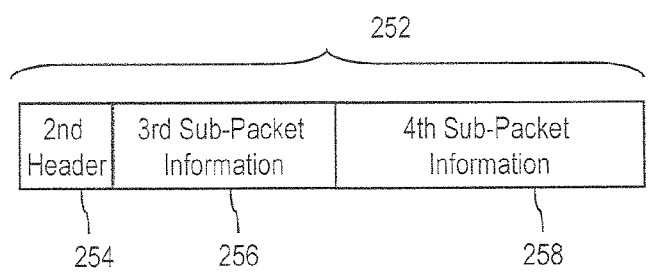
FIG. 2C is a schematic diagram illustrating another payload space of the packet, according to one embodiment of the disclosure.

In conjunction with FIG. 2A, FIG. 2C is schematic diagram illustrating another payload space 252 of the packet, according to one embodiment of the disclosure. The payload space 252 includes a second header 254, third sub-packet information 256, and fourth sub-packet information 258. It is worth noting that the third sub-packet information 256 and the fourth sub-packet information 258 standing alone are considered as a third sub-packet and a fourth sub-packet, respectively. The second header 254 may store the sequence number information for the third sub-packet information 256 when the payload space 252 is in the first packet in any packet sequence.

It is worth noting that, when compared with the embodiment shown in FIG. 2B, the third sub-packet and the fourth sub-packet may not be associated with separated sub-packet error averting information. In other words, the third sub-packet error averting information and the fourth sub-packet error averting information may not distinctly occupy separated space of the payload space 252. Rather, the third sub-packet error averting information for the third sub-packet and the fourth sub-packet error averting information for the fourth sub-packet may be mixed with the third sub-packet information 256 and the fourth sub-packet information 258, respectively.

Regardless, as the header may be critical in ensuring correctness of the sub-packets the header may be encoded by the FEC approach or the like, when the sub-packet information is protected by the corresponding sub-packet error averting information.

Figure 3:
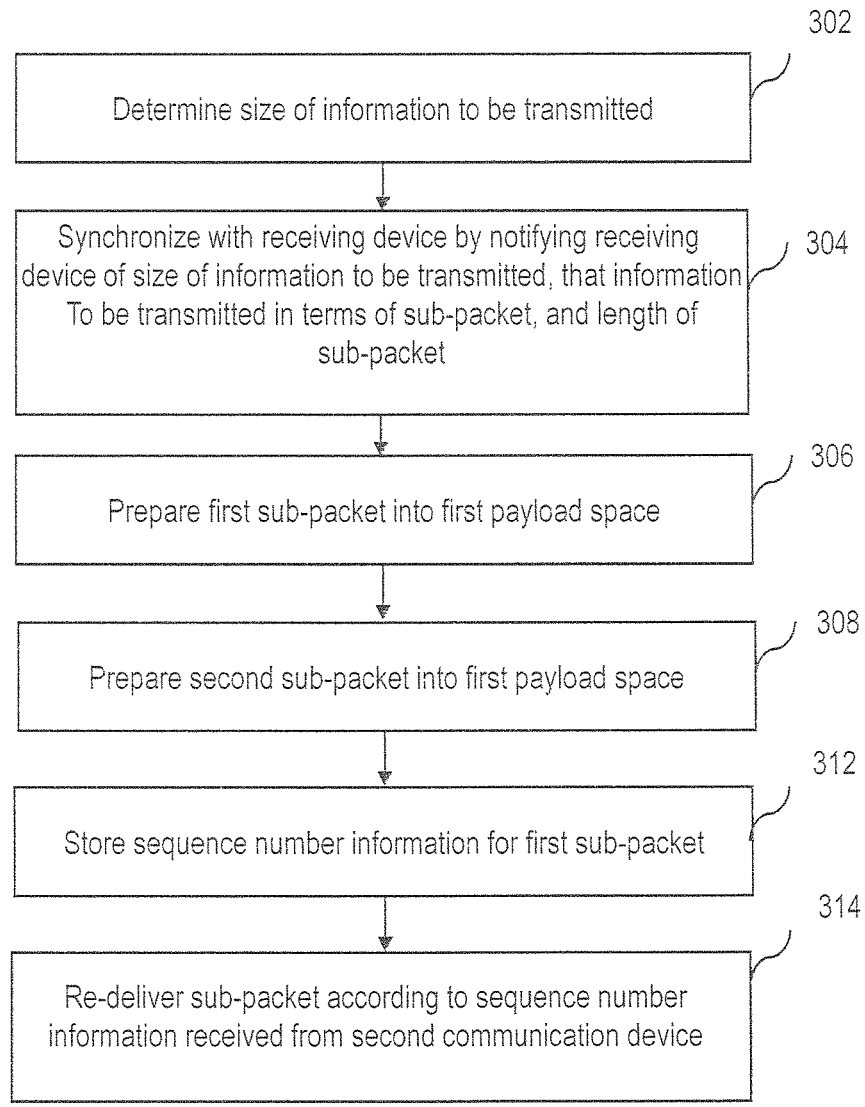
FIG. 3 is a simplified flow chart illustrating operations of the transmitting device, according to one embodiment of the disclosure.

In conjunction with FIG. 2A, FIG. 3 is a simplified flow chart illustrating operations of the transmitting device, according to one embodiment of the disclosure. The transmitting device may determine the size of the information to be transmitted to the receiving device in step 302. The transmitting device may synchronize with the receiving device by notifying the receiving device of the size of the information to be transmitted, the information may be transmitted to the receiving device in terms of a sub-packet, and the length of the sub-packet in step 304. As such, the receiving device may determine number of the sub-packets the receiving device may receive, and whether the receiving device may need to discard certain parts of the sub-packet. For example, when the size of the information to be transmitted is 100 bytes and each sub-packet is 30 bytes in size the transmitting device may inform the receiving device that the information of 100 bytes is to be delivered to the receiving device. And in turn the receiving device may realize that despite four sub-packets in total may be received only the first 100 bytes of the information therein should be considered.

In step 306, the transmitting device may prepare the first sub-packet having the corresponding sub-packet information and/or separated sub-packet error averting information into the first payload space. In step 308, the transmitting device may prepare the second sub-packet having the corresponding sub-packet information and/or the sub-packet error averting information into the first payload space. When packetizing the packet, the transmitting device may further store the sequence number information for the first sub-packet in the header in step 312. The first sub-packet may be delivered to the receiving device along with the second sub-packet.

When notified by the receiving device that any error that takes place over the course of the transmission of the sub-packets, the transmitting device may re-deliver the sub-packets according to the sequence number information stored in the header for the first sub-packet in step 314. For example, when the first sub-packet information 236 in FIG. 2B is not in error with the second sub-packet information 242 suffering from the errors over the course of the transmission only the second sub-packet having the second sub-packet information 242 may be re-delivered by the transmitting device and the receiving device may calculate the sequence number information stored in the first header 234 (e.g., the sequence number for the first information 236) for the first sub-packet to determine the sequence number of the second sub-packet having the second sub-packet information 242.

It is worth noting that in one implementation since the second sub-packet having the second sub-packet information 242 may be larger than the first sub-packet having the first sub-packet information 236 in size when the second sub-packet is to be re-delivered the second sub-packet information 242 may riot be placed at location of the first payload space where the first sub-packet information 236 was placed (e.g., a first predetermined range of the first payload space 212). On the other hand, when only the first sub-packet is to be re-delivered the first sub-packet information 236 may be placed at the location where the second sub-packet information 242 was previously placed (e.g., a second predetermined range of the first payload space 212) or where the first sub-packet information 236 was placed. More specifically, when the first sub-packet information 236 was firstly prepared into the first predetermined range of the first payload space 212 for the transmission and when the first sub-packet is in error the first sub-packet information 236 may be prepared into the first predetermined range or the second predetermined range before being re-delivered. When the second sub-packet information 242 is in error, the second sub-packet information 242 may not be prepared into the first predetermined range before being re-delivered when the size of the second sub-packet information is larger than the size of the first sub-packet information.

Figure 4:
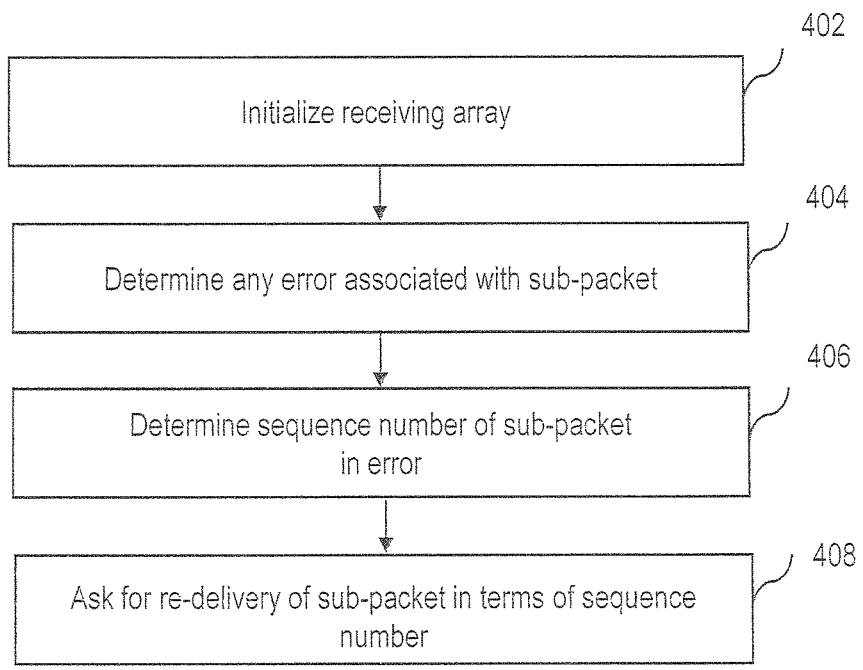
FIG. 4 is a simplified flow chart illustrating operations of the receiving device, according to one embodiment of the disclosure.

FIG. 4 is a simplified flow chart illustrating operations of the receiving device, according to one embodiment of the disclosure. The processing unit of the receiving device may further include a receiving array. And the receiving device may initialize the receiving array when synchronizing with the transmitting device which may inform the receiving device the size of the information to be transmitted, the information to be transmitted to the receiving device would be in terms of the sub-packets, and the length of the sub-packet in step 402. Upon the receipt of the sub-packets, the receiving device may divide the receiving array into multiple parts each corresponds to the sub-packet. In step 404, the receiving device may determine whether any error is associated with the received sub-packets and may correct the error. In one implementation, the receiving device may decode the sub-packet error averting information associated with the sub-packet and may correct the errors that do not exceed a predetermined number of the errors the employed correction method may be capable of handling.

When identifying any error associated with the sub-packet, the receiving device may further determine the sequence number of the sub-packet in step 406 by extracting the sequence number information stored in the header of the first sub-packet in the same packet having the sub-packet in error. After extracting the sequence number information, the receiving device may set values of the receiving array to indicate both the sub-packets in error and not in error. In step 408, the receiving device may ask for the transmitting device to re-deliver the sub-packet identified in terms of the sequence number according to the values of the receiving array. Upon the receipt of a sequence number message indicative of the sub-packet in error, the transmitting device may re-deliver that particular sub-packet.

Figure 5:
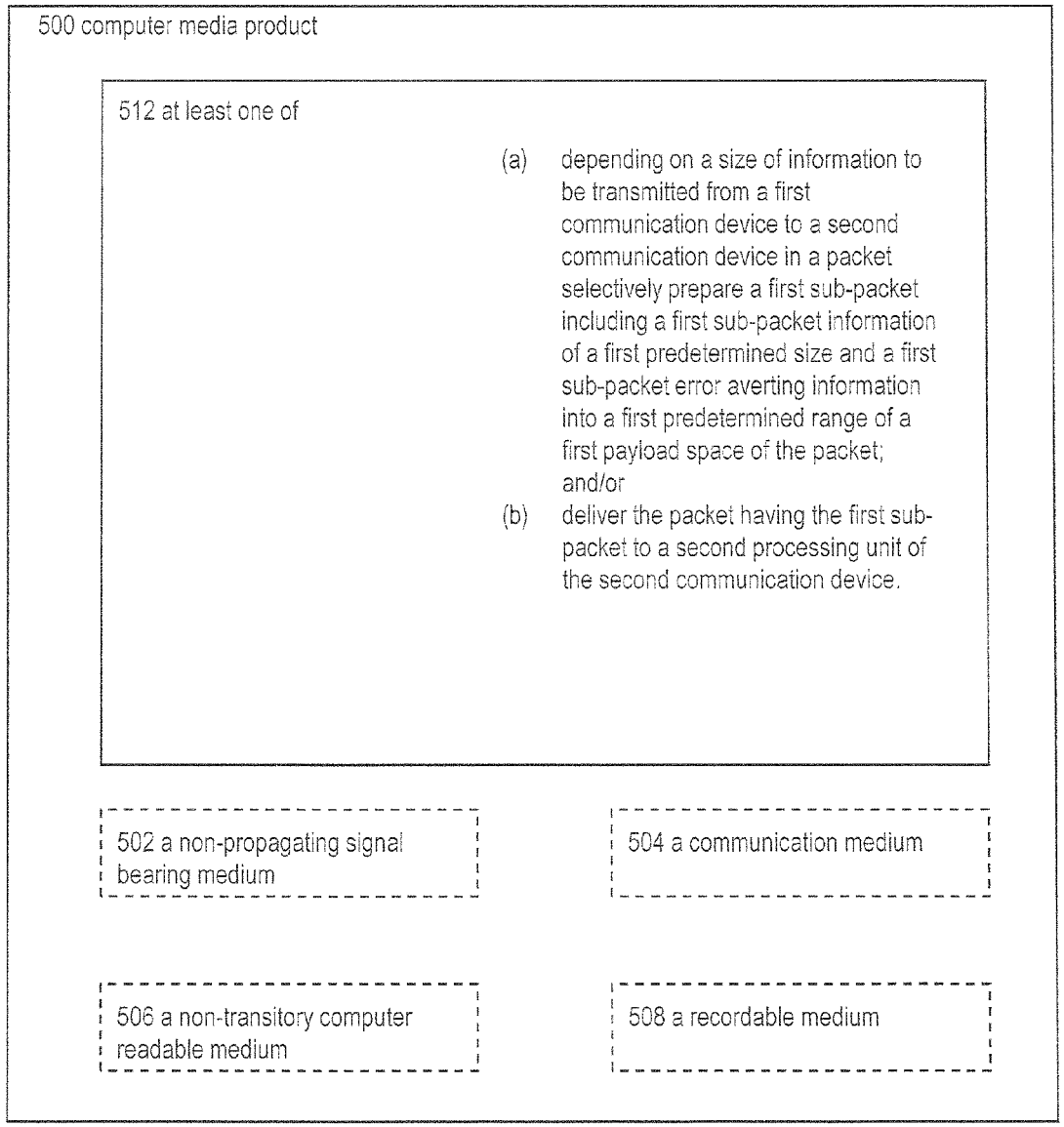
FIG. 5 is a schematic diagram illustrating a computer readable media product, according to one embodiment of the disclosure.

FIG. 5 is a schematic diagram illustrating a computer readable media product 500, according to one embodiment of the disclosure. The computer readable media product 500 may comprise all computer-readable media, with the sole exception being a transitory, propagating signal. For example, the computer readable media product 500 may include a non-propagating signal bearing medium 502, a communication medium 504, a non-transitory computer readable medium 506, and a recordable medium 508. The computer readable media product 500 may also include computer instructions 512 when executed by the processing unit causing the processing unit to prepare the sub-packets in the packet according to the disclosure.

One important feature of the disclosure is to prepare the information to be transmitted from the transmitting device to the receiving device in terms of the sub-packets. Since the information of a large size has been divided into pieces in terms of the sub-packets of smaller sizes, it is more likely that these pieces of the information may satisfy the predetermined threshold for BER, minimizing the occurrence of the re-deliveries and thus improving the efficiency of the communication system.

While the foregoing is directed to embodiments of the disclosure, other and further embodiments of the disclosure may be devised without departing from the basic scope thereof. Therefore, the above examples, embodiments, and drawings should not be deemed to be the only embodiments, and are presented to illustrate the flexibility and advantages of the disclosure as defined by the following claims.

I claim:

1. A communication system, comprising:
a first communication device having a first processing unit; and
a second communication device having a second processing unit;
wherein when packetizing a packet the first processing unit is configured to
 (a) depending on a size of information to be transmitted from the first communication device to the second communication device in the packet selectively prepare a first sub-packet including a first sub-packet information of a first predetermined size and a first sub-packet error averting information into a first predetermined range of a first payload space of the packet, and preparing a second sub-packet having a second sub-packet information of a second predetermined size and a second sub-packet error averting information into a second predetermined range of the first payload space of the packet;
 (b) deliver the packet having the first sub-packet and the second sub-packet to the second processing unit; and
 (c) prepare the first sub-packet information into the first predetermined range of the first payload space or the second predetermined range of the first payload space when the second predetermined size is larger than the first predetermined size and the first sub-packet is to be re-delivered, or prepare the second sub-packet information into the second predetermined range of the first payload space when the second predetermined size is larger than the first predetermined size and the second sub-packet is to be re-delivered.

2. The communication system of claim 1, wherein the second processing unit is configured to decode the first sub-packet error averting information and the second sub-packet error averting information before responding to the first processing unit.

3. The communication system of claim 2, wherein responding to the first processing unit includes asking for the first processing unit to re-deliver either the first sub-packet or the second sub-packet or both of the first sub-packet and the second sub-packet.

4. The communication system of claim 2, wherein the second processing unit further comprises a receiving array and the second processing unit is further configured to initialize the receiving array and set values in the receiving array depending on decoding the first sub-packet error averting information and the second sub-packet error averting information.

5. The communication system of claim 2, wherein when packetizing the packet the first processing unit is further configured to store sequence number information for identifying a sequence number of the first sub-packet in a header preceding the first payload space, so as to allow for the second processing unit to ask for the first processing unit to re-deliver either the first sub-packet or the second sub-packet, or both of the first sub-packet and the second sub-packet.

6. The communication system of claim 1, wherein the first processing unit is further configured to synchronize with the second processing unit by notifying the second processing unit of the size of the information to be transmitted in the packet, that the information to be transmitted is in terms of a sub-packet, and a size of the sub-packet, before delivering the packet to the second processing unit.

7. The communication system of claim 1, wherein the first processing unit and the second processing unit further comprise a first sub-packet error averting calculation unit and a second sub-packet error averting calculation unit, respectively.

8. A communication method between a first communication device having a first processing unit, and a second communication device having a second processing unit, comprising:
  (a) depending on a size of information to be transmitted from the first processing unit to the second processing unit in a packet selectively preparing a first sub-packet including a first sub-packet information of a first predetermined size and a first sub-packet error averting information into a first predetermined range of a first payload space of the packet, and preparing a second sub-packet including a second sub-packet information of a second predetermined size and a second sub-packet error averting information into a second predetermined range of the first payload space of the packet by the first processing unit;
  (b) delivering the packet including the first sub-packet to the second processing unit by the first processing unit; and
  (c) preparing the first sub-packet information into the first predetermined range of the first payload space or the second predetermined range of the first payload space when the second predetermined size is lamer than the first predetermined size and the first sub-packet is to be re-delivered, or preparing the second sub-packet information into the second predetermined range of the first payload space when the second predetermined size is larger than the first predetermined size and the second sub-packet is to be re-delivered, by the first processing unit.

9. The communication method of claim 8, further comprising upon a receipt of the packet decoding the first sub-packet error averting information and the second sub-packet error averting information by the second processing unit.

10. The communication method of claim 9, further comprising asking for the first processing unit to re-deliver either the first sub-packet or the second sub-packet or both the first sub-packet and the second sub-packet by the second processing unit.

11. The communication method of claim 8, further comprising storing sequence number information for identifying a sequence number of the first sub-packet in a header preceding the first payload space, so as to allow for the second processing unit to ask for the first processing unit to re-deliver either the first sub-packet or the second sub-packet, or both the first sub-packet and the second sub-packet.

12. The communication method of claim 8, further comprising synchronizing with the second processing unit by the first processing unit via notifying the second processing unit of the size of the information to be transmitted in the packet, that the information to be transmitted is in terms of a sub-packet, and a size of the sub-packet.

13. A non-transitory computer readable medium comprising a set of computer instructions when executed by a first processing unit for packetizing a packet in a communication system also having a second processing unit causing the first processing unit to:
  (a) depending on a size of information to be transmitted from the first processing unit to the second processing unit in the packet selectively prepare a first sub-packet including a first sub-packet information of a first predetermined size and a first sub-packet error averting information into a first predetermined range of a first payload space of the packet, and prepare a second sub-packet including a second sub-packet information of a second predetermined size and a second sub-packet error averting information into a second predetermined range of the first payload space of the packet;
  (b) deliver the packet including the first sub-packet to the second processing unit; and
  (c) prepare the first sub-packet information into the first predetermined range of the first payload space or the second predetermined range of the first payload space when the second predetermined size is larger than the first predetermined size and the first sub-packet is to be re-delivered, or prepare the second sub-packet information into the second predetermined range of the first payload space when the second predetermined size is larger than the first predetermined size and the second sub-packet is to be re-delivered, by the first processing unit.

14. The non-transitory computer readable medium of claim 13, further comprising the computer instructions when executed by the first processing unit causing the first processing unit to store sequence number information for identifying a sequence number of the first sub-packet in a header preceding the first payload space, so as to allow for the second processing unit to ask for the first processing unit to re-deliver either the first sub-packet or the second sub-packet, or both the first sub-packet and the second sub-packet.

\* \* \* \* \*